(No Model.) 4 Sheets—Sheet 1.
E. BAMBERGER.
HAY GATHERER OR LOADER.
No. 250,123. Patented Nov. 29, 1881.
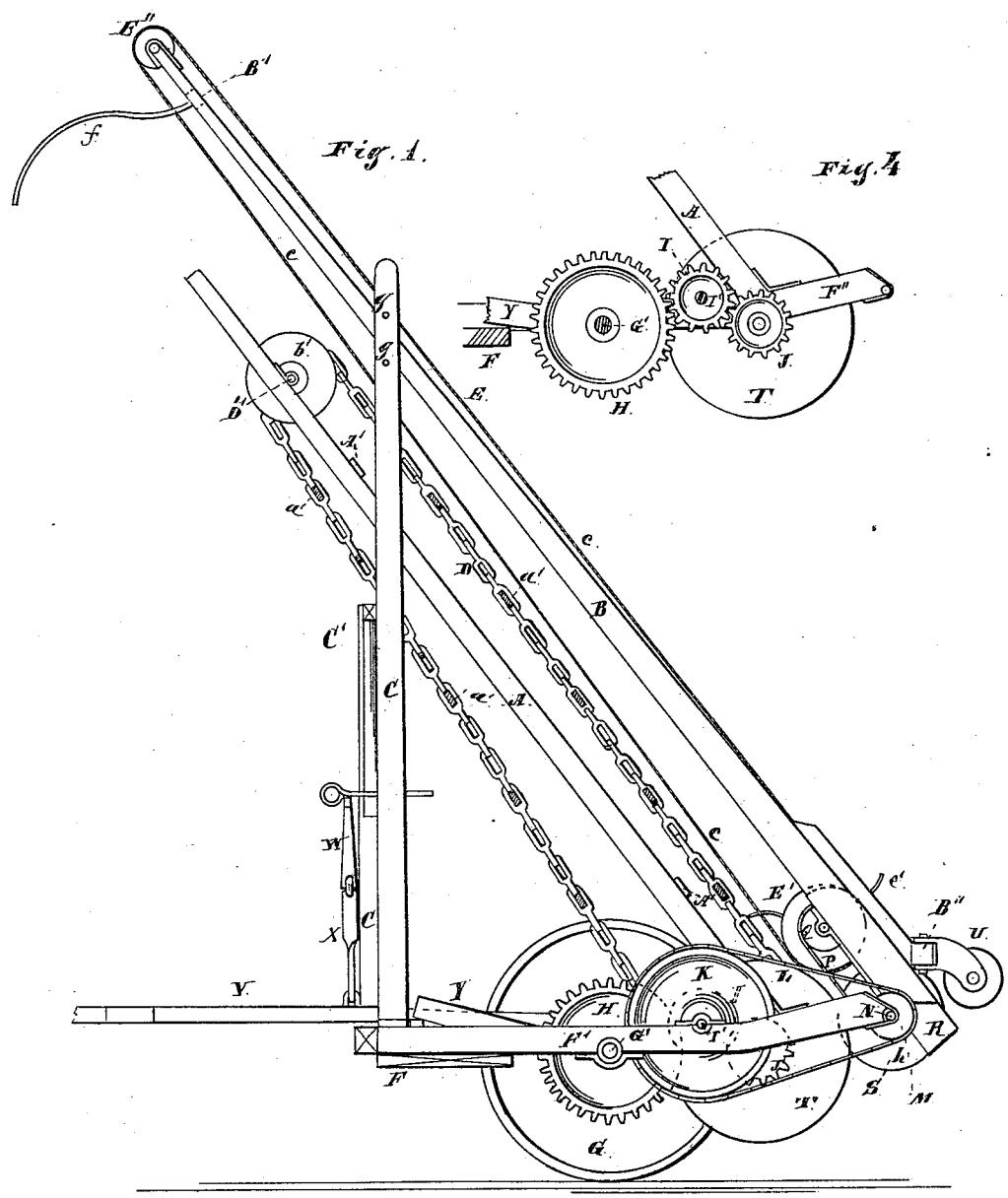
Witnesses:
Albert H. Adams.
B. A. Price
Inventor:
Elias Bamberger
By West & Bond
His attys.

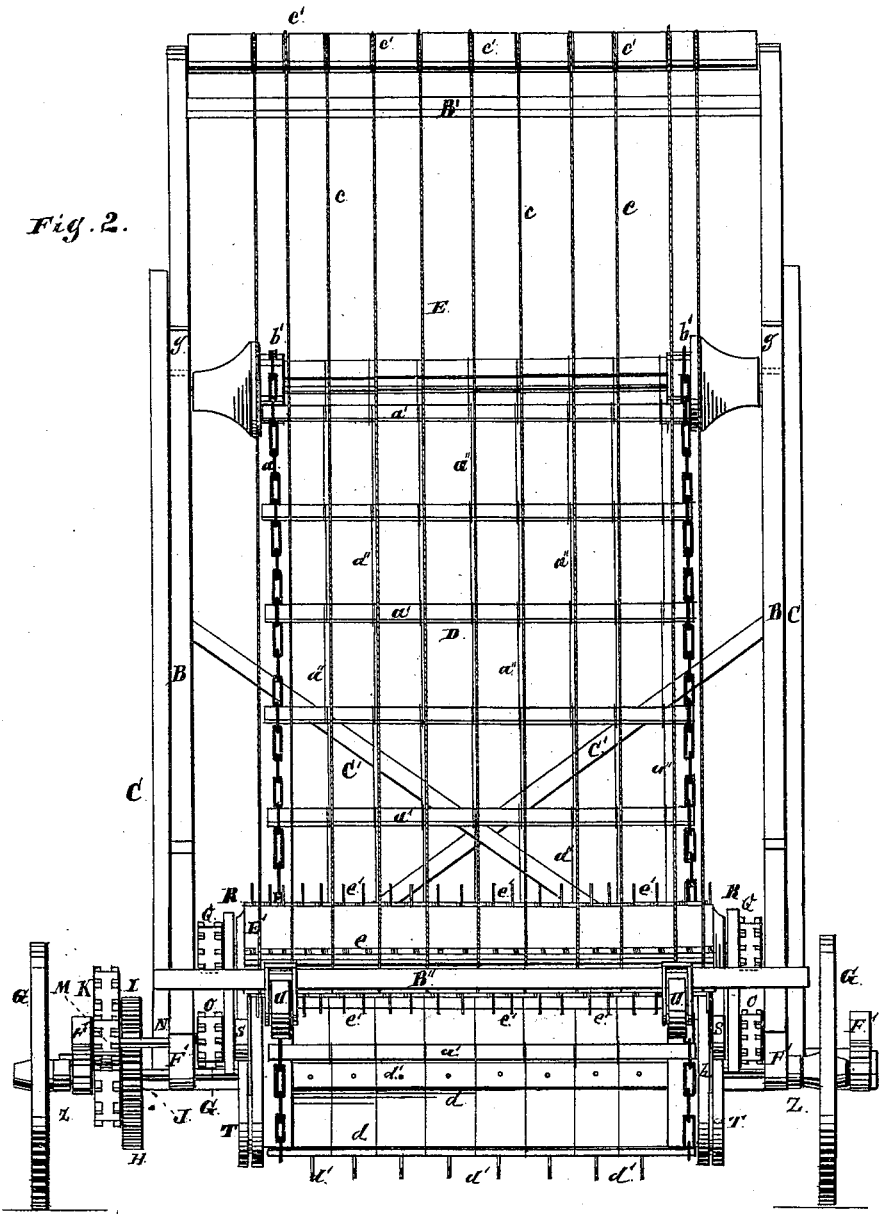

(No Model.) 4 Sheets—Sheet 3.
E. BAMBERGER.
HAY GATHERER OR LOADER.
No. 250,123. Patented Nov. 29, 1881.
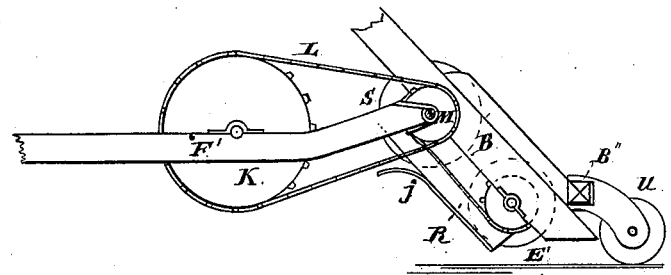
Fig. 6.
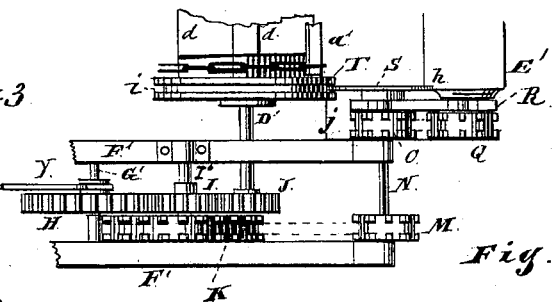
Fig. 3.
Fig. 5.
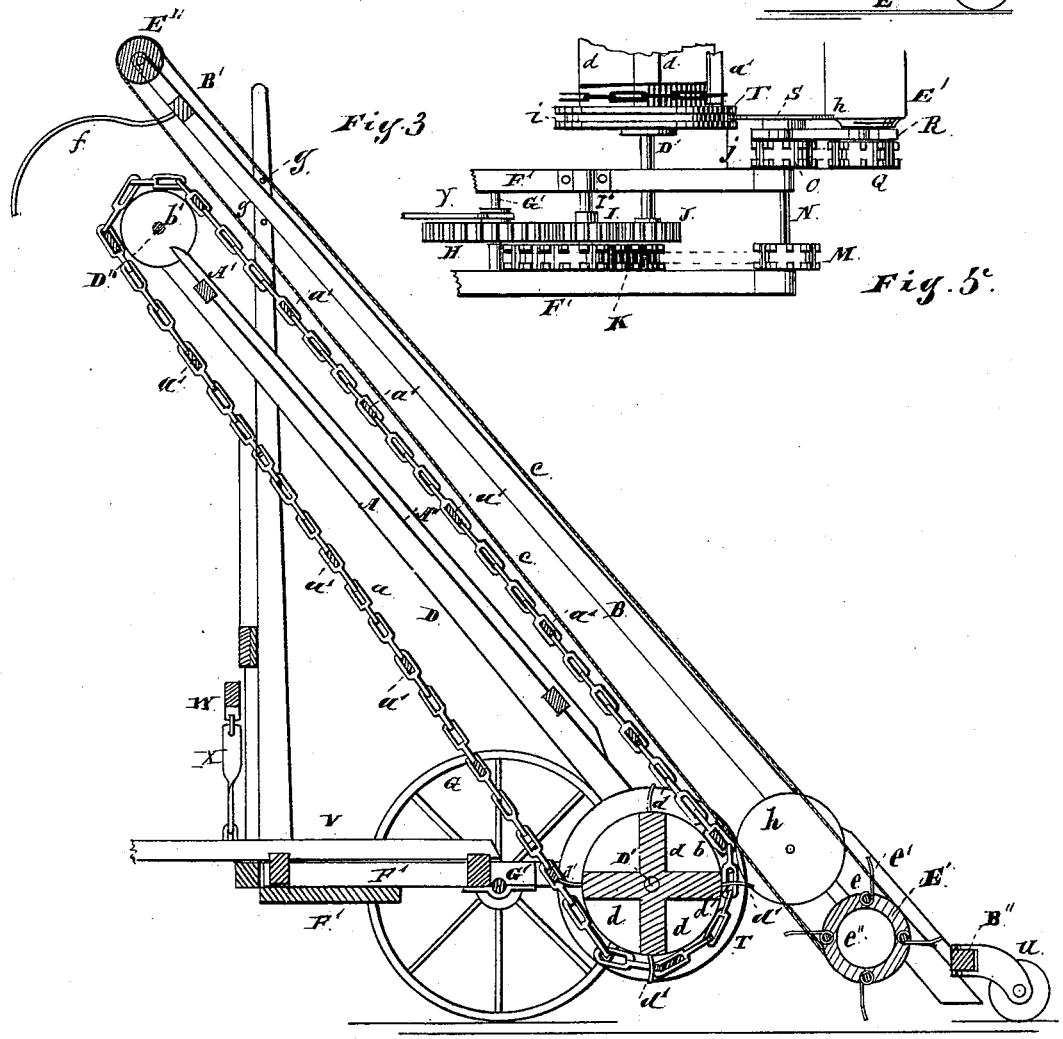
Witnesses:
Albert H. Adams
B. A. Price
Inventor:
Elias Bamberger
By West & Bond
His attys (No Model.) 4 Sheets—Sheet 4.
E. BAMBERGER.
HAY GATHERER OR LOADER.
No. 250,123. Patented Nov. 29, 1881.
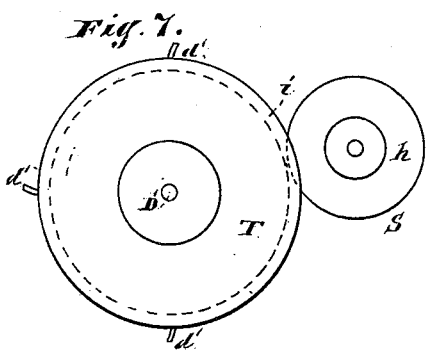
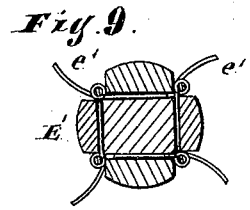
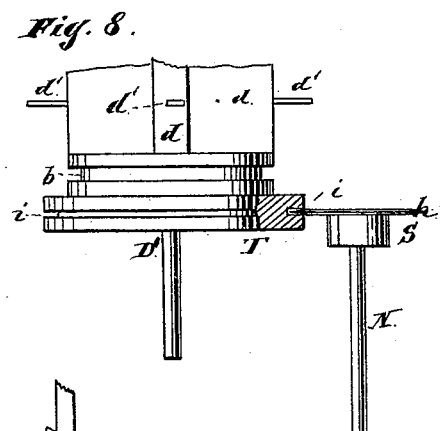
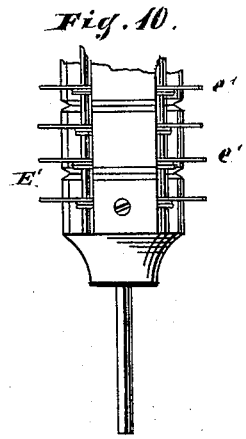
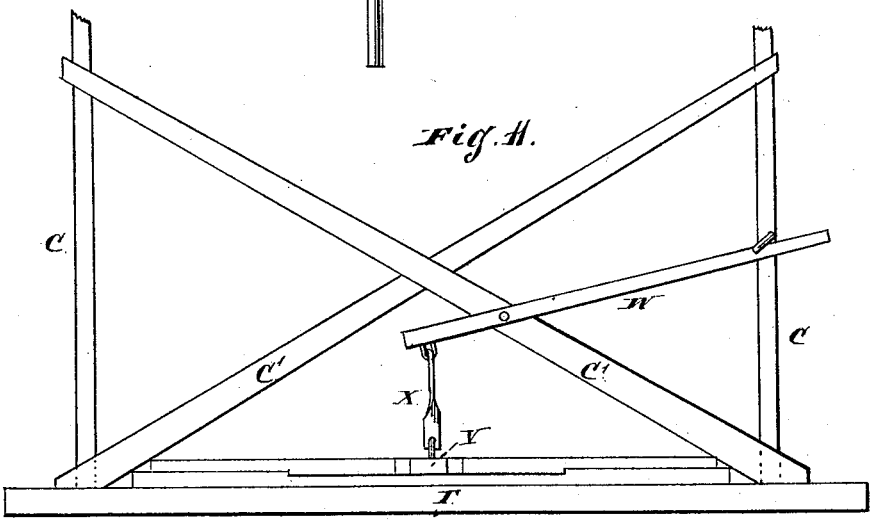

UNITED STATES PATENT OFFICE.

ELIAS BAMBERGER, OF FREEPORT, ILLINOIS.

HAY GATHERER OR LOADER.

SPECIFICATION forming part of Letters Patent No. 250,123, dated November 29, 1881.

Application filed December 8, 1880. (No model.)

*To all whom it may concern:*

Be it known that I, ELIAS BAMBERGER, residing at Freeport, in the county of Stephenson and State of Illinois, and a citizen of the United States, have invented new and useful Improvements in Hay Gatherers or Loaders, of which the following is a full description, reference being had to the accompanying drawings, in which—

Figure 1 is a side elevation with the rake or gathering-roller and the secondary elevator raised and in the position they occupy when the machine is not in operation; Fig. 2, a front elevation with the parts in the position they occupy in Fig. 1; Fig. 3, a vertical section with the rake or gathering-roller and the secondary frame dropped in position for use; Fig. 4, a detail showing the arrangement of the driving-gear; Figs. 5 and 6, details showing the arrangement of the driving-chains and sprocket-wheels for driving the rake or gathering-roller; Figs. 7 and 8, details showing the construction of the cutters; Figs. 9 and 10, details showing the manner of attaching the gathering-teeth; Fig. 11, a detail of the frame adjusting or tipping lever.

This invention relates to what are known as or termed hay gatherers or loaders, or machines designed to be attached to and follow after a wagon or other receiver and act, when drawn across a field after the grass has been cut, to gather up the hay, elevate it, and deposit it in the wagon or other receptacle. Various forms of machines or apparatus have been employed for this purpose, consisting, essentially, of a gathering device and elevating mechanism mounted on a suitable frame, supported on wheels, and capable of being attached to the rear of the wagon or other receiver into which the hay is to be deposited.

The objects of this invention are to improve the construction and operation of this class of machines and enable the gathering and elevating devices to adapt themselves to the inequalities of the ground and not interfere with their operation, and to improve the construction, arrangement, and operation of the gathering and elevating devices, so as to insure a perfect and reliable elevation under all circumstances, and have the portion elevated effectually separated or divided from the hay on the ground, so as not to interfere with the elevation.

In the drawings, A represents the side bars or supports of the main elevator-frame; A', the cross-bars of the frame; A'', the guides or supports for the main elevator; B, the side bars or supports of the secondary or retaining elevator-frame; B' B'', the cross-pieces of the frame B; C, the support for the upper ends of the frames A B; C', the tie-braces for the supports C; D' D'', the upper and lower shafts of the main elevator D; E' E'', the upper and lower rollers of the secondary or retaining elevator E; F F', the main frame; G, the supporting-wheels; G', the axle of the supporting-wheels; H I J, the gear-wheels; K L M N O P Q, the driving mechanism for imparting movement to the secondary or retaining elevator, the rake or gathering roller, and the cutting devices; R, the pivoted bars or supports for connecting the lower end of the secondary or retaining elevator with the main frame, and also for carrying a portion of the driving devices; S, the male cutter; T, the female cutter; U, the caster or safety wheels; V, the tongue; W, the tilting-lever; X, the connecting-link between the lever and the tongue; Y, the lever for throwing the gear-wheels out of connection; Z, the clutches for the carrying-wheels; *a*, the chains of the main elevator; *a'*, the cross-pieces of the main elevator; *a''*, the supporting cords or ropes; *b b'*, the pulleys or sprocket wheels for the chains *a*; *c*, the cords, ropes, or cables of the secondary or retaining elevator E; *c'*, the grooves in the rollers E' E'' for the cords, ropes, or cables *c*; *d*, the flanges or wings on the shaft D'; *d'*, the teeth or pins on the flanges *d*; *e*, the attaching-rods for the rake-teeth; *e'*, the rake-teeth; *e''*, the grooves in the roller E' for the rods *e*; *f*, the guide-rods or fingers; *g*, the guide-pins for the upper end of the frame B; *h*, the cutting blade or cutter; *i*, the groove for the edge of the cutter; *j*, the guard-plates for the driving devices.

The side bars or supports A are located on each side of the main frame, and are attached at their lower ends to the main frame in any suitable manner. These bars extend upward the distance required for the elevation, and are placed at an angle of inclination to facilitate the elevating. The cross-bars A' are secured at either end to the side bars, A, and support the bars A'', which bars serve as supports or guides for the elevator to travel on and prevent it from sagging in the center. The upper ends of the bars A are supported by vertical posts or supports C, one for each bar A, the lower ends of which are attached to the main frame in any suitable manner, and these bars C are united and strengthened by suitable tie-braces C', extending diagonally from one post C to the other.

The side bars or supports B are somewhat longer than the bars A, and are located so as to lie above the bars A and in line, or nearly so, therewith. These bars are united by suitable cross-bars, B' B'', located at the upper and lower ends. The upper ends of the bars B are supported by the bars C, which project above the bars A sufficiently far for the purpose, and their upper ends are maintained in proper relation to the bars A to leave the necessary space for the passage of the hay between the respective elevators in any suitable manner. As shown, pins $g$ project from the bars C, between which the bars B pass, retaining the upper ends of the bars in position and allowing the bars to slide up and down; but other forms of attachment suitable for the purpose may be provided—such, for instance, as a pivoted link or a jointed connection.

The shaft D' is located at the lower end of the elevator-bars A, and is mounted in suitable bearings located in the bars A, or in the side bars of the main frame; and the shaft D'' is located near the upper end of the bars A, and is mounted in suitable bearings located on the bars. Near the ends of the shaft D', within the bars A, is located a pulley or sprocket wheel, $b$, and on the shaft D'' correspondingly, and in line with the pulleys or sprocket-wheels $b$, are located pulley or sprocket wheels $b'$, which wheels $b\ b'$ carry and operate the main elevator D, formed by chains $a$, which pass over the pulley or sprocket wheels $b\ b'$—one on each side—a portion of the links of which chains receive the ends of suitable cross-pieces, $a'$, to which are attached cords or ropes running parallel with the chains $a$, so as to form a bed or support on which the hay can lie while being elevated. This elevator is located within the side bars or frame A, and is driven by the rotation of the pulleys or sprocket-wheels on the shaft D', and has an upward movement that will act to carry the hay toward the upper end and deliver it at that point; and any other form of elevator, located, arranged, and operating within the frame to deliver the hay at its upper end, may be used.

The roller E' is located at the lower end of the side bars B, and is mounted in suitable bearings on the bars, and the roller E'' is located at the upper end of the bars B, and is mounted in suitable bearings on the bars. These rollers are each provided with a series of transverse grooves, $c'$, to receive ropes, cords, or cables $c$, which form the secondary or retaining elevator E. These rollers E' E'' have a rotary motion given to them opposite to that of the pulleys $b\ b'$ of the main elevator, so that the moving portions of both elevators which lie adjacent to each other, and between which the hay is elevated, will have the same direction of travel, and the secondary or retaining elevator will assist the main elevator in elevating the hay, giving the hay a more perfect and rapid elevation, and at the same time this elevator will prevent the hay from being blown away or off the main elevator. The upper end of this secondary elevator projects beyond the point where the main elevator ends, and acts to turn the hay as it passes over the end of the main elevator and give it a downward movement; and, in order to insure the downward movement, the upper bar, B', is provided with a series of downwardly curved or bent fingers or arms, $f$, against which the hay will strike and its line of travel be changed and given a downward direction.

The shaft D' has attached thereto a series of wings or flanges, $d$, (four,) as shown, which stand at right angles to each other and extend longitudinally across the shaft between the pulleys or sprocket-wheels $b$, on each of which flanges is a series of projecting teeth or pins, $d'$, of sufficient length to project beyond the main elevator at the point where the elevation commences and to pass below the elevator and be withdrawn from engagement with the hay after it has been fairly caught between the elevators, the pins or teeth $d'$ assisting and aiding the rake or gathering roller in raising the hay evenly to be carried or elevated by and between the two elevators.

The roller E' has a series of teeth, $e'$, extending in rows longitudinally across the roller, which teeth are bent or curved properly to act and raise the hay from the ground, the roller E' being arranged and located properly in relation to the ground for the teeth to act on the hay. These teeth, as shown, are formed by coiling a piece of wire around a rod, $e$, so as to allow the teeth to have a spring action, and they are secured to the roller by placing the rods in longitudinal grooves $e''$ formed in the face of the roller and securing them therein either by driving the end of the coiled wire into the roller or by staples passing over the rods, or in some other suitable manner. The roller E' is so located and arranged in reference to the flanges $d$ on the shaft D that when the parts are in position for use the teeth $e'$ will, as the roller revolves, take the hay from the ground, and carry it around in position to be caught by the teeth or pins $d'$ and lifted from the teeth $e'$ and passed between the elevators by the revolution of the shaft D.

The lower end of the secondary or retaining elevator-frame is connected to the main frame, so that it is free to rise and fall and allow the roller E to conform to the unevenness of the ground and still have the teeth e' perform their work. As shown, the connection is made by bars or strips R—one on each side—each bar connected at one end pivotally to the side bar B and at the other end pivotally to the side bars of the main frame, so as to leave a perfect freedom of movement in rising and falling and keep the roller E' in proper relation to the ground; and, in addition to this feature of rising and falling, this mode of connection allows the secondary or retaining elevator to be thrown upward, raising the roller E' clear from the ground, which is desirable when the machine is not in operation or in moving from place to place.

In addition to the described functions of the pivotal connections of the lower end of the secondary elevator-frame with the main frame, these pivotal connections further subserve the function of limiting the movements of the secondary elevator outward from the main frame to the extent of the pivoted connecting links or bars R, so that under no circumstances will this secondary elevator, in connection with its gathering-roller E', fail to properly and accurately perform its functions, as will occur in those machines in which the lower end of the secondary elevator is disconnected and free to move or to be moved to such distance away from the main elevator as that the gathered material will not be caught and elevated.

To the lower cross-bar, B'', are attached two caster or safety wheels, U, which, when the machine is in operation, come in contact with the ground and assist in holding up the frame or bars B and limit the point of descent, so as to maintain the roller E' at the proper elevation for the teeth e' to act. These wheels U also act as safety-wheels in turning, and support the lower end of the frame, so that it will not be carried by the roller E', leaving the roller entirely free to drive the secondary elevator and to gather the hay without hinderance or interference by the teeth e' striking the ground.

The main frame, which carries the elevating apparatus, consists of a cross piece or board, F, and side bars or supports F'. Attached to the cross bar or board F in any suitable manner, as shown, four side bars are provided, two on each side, located at a little distance apart, and between the rear ends of the inner cross-bars are located the devices which take the hay from the gatherer and deliver it to the elevators. This main frame is supported upon suitable carrying-wheels, G, the axle G' of which is suitably journaled in or on the side bars F', so that the axle serves as a pivot on which the elevating devices can turn or swing, so as to ride freely over the ground, the axle being so located in reference to the weight of the elevating apparatus that the apparatus will be very nearly balanced fore and aft, allowing the frame to tip in either direction readily.

On the axle G', at one end, between the side bars F' of the frame, is located a gear-wheel, H, attached to the shaft or axle G', so that it can slide thereon and be made to engage and revolve with the shaft or be made to disengage and allow the shaft to revolve without communicating motion to the wheel; and gearing with this wheel H is a smaller gear-wheel, I, located on a short shaft, I', which has its bearing in or on the side bars F', which wheel, in turn, gears with a wheel, J, attached to the end of the shaft D', by means of which gears H I J motion is communicated to the shaft D' for revolving the shaft and driving the main elevator, and also for revolving the flanges d, carrying the pins d', to take the hay from the rake or gathering-roller.

Attached to or formed with the wheel I is a sprocket-wheel, K, over which a chain, L, runs, which chain also runs over a smaller sprocket-wheel, M, attached to a short shaft, N, which has its bearing in the outer ends of the side bars F', on which shaft is located a second sprocket-wheel, O, over which a chain, P, passes, which chain passes over a sprocket-wheel, Q, attached to the end of the shaft or journal of the roller E'.

By means of the sprocket-wheels K and M, chain L, and sprocket-wheels O Q, and chain P, motion is communicated from the axle G', through the wheels H I, to the roller E', for revolving the roller to drive the secondary elevator and cause the teeth e' to gather the hay. By this arrangement it will be seen that the several devices are driven from the forward movement of the machine, and that the revolution of the shaft D' will be opposite to that of the roller E', the roller E' receiving its movement from the wheel I, which has an opposite revolution to the wheel J, which revolves the shaft D'.

The gears H I J and sprocket-wheels K M and chain L are only provided for one side of the machine; but duplicates of the sprocket-wheels O Q and chain P are provided for the other side of the machine, the sprocket-wheels O Q being located on a shaft corresponding to the shaft N, having its bearings in the ends of the side bars F' on that side of the machine, motion being communicated thereto by the revolution of the roller E'.

To the shafts N, as shown, are pivoted the inner ends of the swinging supports R, the other ends, as shown, being pivoted to the shaft or journal of the roller E', so that the supports can be folded over as the frame or side bars B are raised without disconnecting the chains P from their sprocket-wheels, the wheels always maintaining the same distance apart, whether the supports are raised or lowered.

Both shafts N project beyond the inner side bars, F', and to their projecting end is attached a cutter, S, having a circular cutting-blade, h, which blade is in line with and enters a groove, i, in the periphery of a circular disk or wheel, T, located on the shaft D', which wheel or disk may be formed with the sprocket-wheel b or be attached thereto in any suitable manner, or may be separate and distinct therefrom. The disks or wheels T—one on each side of the main elevator—are located on the shaft D', so as to be just clear of the line of the elevator on each side, and revolve with the shaft, and the cutters S have an opposite revolution given to them from the shafts N, and act to sever the hay at the point of junction between the peripheries of the cutters h and the disks or wheels T, so that the portion of the hay to be elevated will be divided from the hay on the ground; and, in order to prevent the hay from being dragged into the chains and sprocket-wheels, a guard, j, is provided, secured to the under side of R, and extending up and curved around in line with the point of cutting, against which the ground hay will strike, so as not to be caught by the wheels or chain. One cutter only will operate after the first cutting, as the other will be outside of the line of elevation. These cutters prevent the hay on the ground from interfering with the elevation by clinging to the portion to be elevated, as they make a clean separation before the elevation commences by severing one portion from the other outside the line of the elevation.

The tongue V may be of any suitable form of construction for attaching the machine to the rear of a wagon or other receiver. Its rear end is pivoted to the axle G', leaving the main frame free to tilt without affecting the tongue, and at the same time the tongue acts as a stop, when locked, to prevent the frame from tilting too far back or down at its rear end.

The lever W is pivoted to one of the tie-braces C', and its inner end is connected with the tongue by a link, X, and its outer end extends outwardly beyond the support C and engages with a pin or stop on the support, which prevents it from being thrown too far up, so as to throw the rear end of the main frame down and drag the roller E' or press the wheels U too hard on the ground, and forms a lock with the tongue for maintaining the rear end of the frame properly in position, but does not prevent the frame from tilting forward to raise the rear end thereof. By depressing this lever W the main frame and the entire elevating apparatus will be carried entirely on the wheels G and balanced over the axle G', so as to ride freely and allow perfect ease in moving the machine from place to place.

A lever, Y, or other device, is provided, pivoted to or located on the side of the main frame, for adjusting the wheel H. The lower or outer end of the lever, when used, is forked and passes over and connects with a hub or flange on the wheel H, so that by moving the upper or inner end of the lever in or out the wheel H can be adjusted on the shaft or axle G', so as to revolve with the axle and impart movement to the elevating devices or remain stationary and stop the movement of the elevating devices.

In order to prevent movement of the elevating apparatus in a backward direction when the machine is backed, clutches Z, located on the axle G' adjacent to the carrying-wheels and engaging the wheels' hubs, are provided, which clutches may be of any of the well-known forms of construction for such devices employed, when it is desired that motion shall be imparted to a shaft or axle only when the driving device is revolving in a certain direction. These clutches also facilitate turning, as they allow either wheel to stand stationary or revolve backward while the other is being carried around in turning the machine, by which arrangement the machine can be turned more squarely and in less space.

The operation will be readily understood from the foregoing description. When in position to gather the hay the upper or secondary elevator-frame is dropped, so that the teeth e' will pick up the hay. As the machine is drawn forward movement will be imparted to the several devices in the manner already described, which movement gathers the hay, passes it to the elevator, severs the portion to be elevated from the portion on the ground, and elevates and delivers it into the wagon or receptacle, making the entire operation an automatic one, and one which will effectually accomplish the desired end in an efficient and reliable manner.

The roller E' may be made hollow, as shown in Fig. 3, or it may be made solid, as shown in Figs. 9 and 10, suitable journals being provided at the ends in either case; and, instead of the form of rake-teeth shown, other forms may be used, attached to the roller in any suitable manner.

What I claim as new, and desire to secure by Letters Patent, is as follows:

1. In a hay-gatherer, the combination, with the main elevator supported by a frame mounted on wheels, of the secondary elevator arranged over the main elevator and suspended at its lower end by bars or links, which are pivotally connected at their ends to the wheel-frame and the secondary elevator, said secondary elevator having a free sliding movement at its upper portion, which is limited by the pivoted bars or links, substantially as and for the purpose described.

2. In a hay-gatherer, the side bars A, cross-pieces A', supports or ways A'', shafts D' D'', provided with pulley or sprocket wheels b b', and elevator D, consisting of the chains a, cross-pieces a', and cords or ropes a'', the whole forming the main elevator, in combination with the side bars B, cross or end bars, B' B'', grooved rollers E' E'', and elevator E, consisting of cords, ropes, or cables c, running in grooves c' in the rollers E' E'', the whole forming the secondary or retaining elevator, and having a rising-and-falling movement at its lower end, the adjacent portions of the elevators between which the hay is carried having a corresponding line of travel in an upward direction to increase the speed of elevation, substantially as specified.

3. In a hay-gatherer, the combination, with the main elevator supported by a frame mounted on wheels, of the secondary elevator connected at its lower end with the wheeled frame by pivotal connections, which permit but limit the rising and outward movement of the secondary elevator, and the revolving gathering-roller carried by the lower portion of the secondary elevator and provided with radial rake-teeth, all substantially as described.

4. In a hay-gatherer, the combination of the main elevator supported by a frame mounted on wheels and a secondary elevator arranged over the same and connected at its lower portion by pivoted bars or links, which permit but limit its rising and outward movements, the gathering-roller E', carried by the secondary elevator-frame and provided with radial rake-teeth, and the roller or shaft D', arranged at the foot of the main elevator and provided with a series of pins or teeth, d', for propelling the hay and evenly delivering it between the two elevators, substantially as described.

5. In a hay-gatherer, the combination, with the main elevator, supported by a wheeled frame, and a secondary elevator, E, connected at its lower portion by pivoted bars or links with the wheeled frame, of the gathering-roller E' having yielding radial rake-teeth, the shaft D', provided with flanges d, each having a series of pins, d', for propelling the hay and evenly delivering it between the elevators, substantially as described.

6. In a hay-gatherer, a main elevator, D, located in a frame consisting of the side bars A and cross-bars A', in combination with a secondary or retaining elevator, E, located in a frame consisting of side bars B and cross-bars B', loosely supported at its upper end and pivotally connected at its lower end, for allowing the secondary elevator to be raised and carried clear of the ground in moving the machine around and to rise and fall at its lower end when the machine is gathering hay, substantially as and for the purposes specified.

7. In a hay-gatherer, the disks or wheels T, provided with the grooves $i$, in combination with the cutters S, having the circular cutting-blades $h$, for severing the hay before being elevated either side of the elevating devices, substantially as and for the purposes specified.

8. In a hay-gatherer, the tongue or connection V, pivoted to the axle of the ground-wheels, in combination with the main frame pivoted and balanced on said axle and carrying an elevating mechanism, the said main frame and the tongue or connection being disconnected from each other and each adapted to independently tilt or swing, substantially as described.

9. In a hay-gatherer, the tongue or connection V, pivoted to the axle or shaft of the carrying-wheels, and lever W, pivoted to the elevator-frame and connected with the tongue or connection V, in combination with a main frame, also pivoted to the axle or shaft of the carrying-wheels, and supporting an elevating mechanism, for raising the main frame and elevating mechanism clear of the ground to be carried entirely by the carrying-wheels, substantially as and for the purposes specified.

ELIAS BAMBERGER.

Witnesses:
HENRY W. FRY,
EPHRAIM BAMBERGER.